United States Patent [19]
Bennett

[11] 3,961,533
[45] June 8, 1976

[54] DIFFERENTIAL FLUID-PRESSURE TRANSDUCER

[75] Inventor: Milton C. Bennett, Moline, Ill.
[73] Assignee: J. I. Case Company, Racine, Wis.
[22] Filed: Apr. 22, 1975
[21] Appl. No.: 571,011

[52] U.S. Cl. ................................................. 73/419
[51] Int. Cl.² ......................................... G01L 7/16
[58] Field of Search ............ 73/419, 407 R, 388 BN

[56] References Cited
UNITED STATES PATENTS

| 1,992,343 | 2/1935 | Ahnstrom | 73/388 BN |
| 3,034,357 | 5/1962 | Brown | 73/419 |
| 3,198,014 | 8/1965 | Corry | 73/419 |

Primary Examiner—Donald O. Woodiel
Attorney, Agent, or Firm—Arthur J. Hansmann

[57] ABSTRACT

A differential fluid-pressure transducer having a housing with two spaced-apart fluid inlet openings and two fluid outlet openings. A spool is slidably disposed in the housing and has two oppositely-faced surfaces disposed intermediate the inlet openings, for receiving pressure from each respective inlet opening. The spool has a fluid passageway in flow communication from one of its two surfaces to a compartment at the end of the spool, whereby fluid pressure from one of the two inlet openings acts on both the one oppositely-faced surface and on the end of the spool which defines the compartment, and the fluid pressure at the other inlet opening influences the position of the spool, all for detecting the difference in pressure at the two inlet openings. Also, the spool can slide to a position which flow communicates the compartment to one of the housing outlet openings to thereby relieve pressure in the compartment. Finally, an instrument, such as a gauge or switch, can be fluid-flow attached to the other housing outlet which is in communication with the compartment to thereby detect the fluid pressure difference between the two inlet openings.

8 Claims, 2 Drawing Figures

DIFFERENTIAL FLUID-PRESSURE TRANSDUCER

This invention relates to a differential fluid-pressure transducer, and, more particularly, it relates to a device for detecting the difference in fluid pressure in two fluid lines, and the device may be used either for informational purpose or for actuating an instrument or mechanism, such as a switch.

BACKGROUND OF THE INVENTION

The transducer of this invention is intended to have particular application for detecting differences in fluid pressure in two separate fluid lines which are connected in a fluid system. For instance, the system may be a hydraulic system utilized in vehicles, including tractors, trucks, and the line, and the system would commonly include a hydraulic filter element which is receiving hydraulic fluid for the usual purpose of filtering and cleaning the fluid. However, the hydraulic system mentioned commonly becomes contaminated to a degree where the hydraulic flow is no longer tolerable or satisfactory, and that might occur when the equipment is used under conditions which are conducive to such contamination, even though the recommended schedule for changing the filter is abided by. That is, the change recommendation is commonly based on a length of time or a number of operation hours or other length of time, but that criteria is not always satisfactory and the filter can become clogged even though the recommended change interval is followed. Many factors make the recommended change interval inadequate in actual practice, and those factors include varying environmental operating conditions, cleanliness of the fluid added to the system, failure of components within the system, servicing procedures, and the like. Consequently, the user does not know when the filter actually needs to be changed, and even following the recommended change interval is not always the answer.

The problem with the filter element in the hydraulic system mentioned is that the user does not know when the filter needs to be changed, and that change should occur when the differential fluid pressure across the filter element exceeds a minimum amount. The present invention provides a transducer which is connected to the fluid-pressure lines across the filter element, and the transducer is arranged for detecting the pressure differential and to thereby indicate when the filter element needs to be changed. Of course the transducer of this invention is not limited in its application to monitoring the filter element in a hydraulic system, but it is useful wherever it is desirable to detect a fluid-pressure difference in two fluid lines.

Accordingly, it is the objective of this invention to provide a differential fluid-pressure transducer which will accurately and readily indicate the pressure difference in two fluid-pressure lines. Further, in accomplishing the aforementioned objective, the present invention provides the transducer at a relatively low cost and permits the use of common instruments to be actuated by the transducer and thereby govern monitor items such as relief valve settings, fluid line pressure drops, pressure drops through control valves, and simply having a guage or the like for visual indication of pressure differences in two fluid lines, and the transducer can also be used to actuate conventional switches or the like.

Other objects and advantages will become apparent upon reading the following description in light of the accompanying drawings.

DETAILED DESCRIPTION OF THE PREFERRED EMBODIMENT

Figure 1:
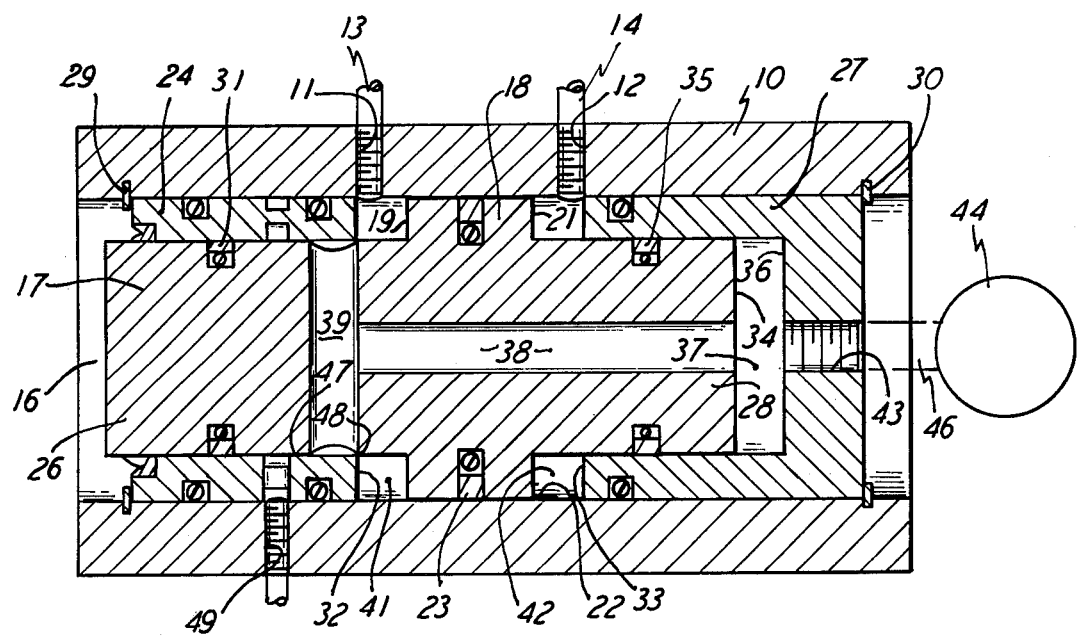
FIG. 1 is a longitudinal sectional view showing a transducer made according to this invention.

The drawings show the housing 10 having two spaced-apart fluid inlet openings 11 and 12 to which fluid lines 13 and 14 are connected, respectively. The housing 10 has an intermediate chamber 16 which slidably receives a spool member 17. The spool has an enlarged portion 18 disposed intermediate the inlet openings 11 and 12, and it presents an annular area or surface 19 and an annular area or surface 21, and the surfaces 19 and 21 are respectively exposed to the inlet openings 11 and 12 to thereby receive the fluid pressure available in those two openings.

The spool 17 is slidably disposed in the housing 10, and the spool is shown to be cylindrically shaped and is fluid tight with the circular inner wall 22 of the housing 10. A fluid seal 23 renders the spool 17 fluid-tight with the wall 22 and thereby fluid-tightly separate the the two openings 11 and 12 from each other. Also, the housing 10 has a cylindrically-shaped sleeve 24 which encircles one end 26 of the spool 17, and the housing has a cup-shaped member 27 disposed at the other end of the housing 10 and encircling the spool end 28. Seals 31 and 35 render the spool 17 fluid-tight with the housing members 24 and 27. Of course it will also be noticed that the members 24 and 27 are fixed within the housing 10, such as by means of the snap rings 29 and 30.

Thus, the spool 17 can slide back and forth between the positions of abutment with the members 24 and 27 such that the spool annular surface 19 can slide to the surface 32 of the housing member 24, and the spool surface 21 can slide to the surface 33 of the housing member 27, and thus the surface 32 and 33 present limits or stops for the sliding movement of the spool 17. Also, the spool portions 26 and 28 are fluid-tight with the respective inner circumferential walls of the housing members 24 and 27, though the spool 17 can slide therein as mentioned, by virtue of the seals 31 and 35.

The spool end surface 34 and the surface 36 of the housing member 27 together define a compartment designated 37. A fluid passageway 38 and a fluid passageway 39 are in fluid-flow communication, as shown, and they are therefore in fluid-flow communication with the annulus designated 41 which is defined by the spool and the inner circular wall 22 of the housing 10. There is also another annulus 42 which is adjacent the surface 21, as shown. With that arrangement, when the spool 17 is sufficiently displaced to the right, as viewed in FIG. 1, fluid entering the opening 11 will go the annulus 41 and into the passageways 39 and 38 and into the compartment 37. A fluid outlet opening 43 is in fluid-flow communication with the compartment 37 and is in the housing and extends exteriorly of the housing, as shown. A fluid-pressure gauge 44, of any conventional design and arrangement, is disclosed as being fluid-tightly connected with the outlet 43, such as through a connecting line designated 46 in dot-dash lines, and thus the compartment 37 is closed to the free access or exit to the exterior of the housing 10, for a purpose mentioned later. The guage 44 may be of a conventional arrangement for revealing the fluid pressure in the compartment 37, or it may be a switch or other instrument, as mentioned at the outset of this document.

The spool end 26 and piece 24 are adapted, such as by relative diameter sizes, so that there is clearance therebetween to permit fluid leakage from annulus 41 to passage 39, and from passage 39 to drain port 49. The spool position determines the relative magnitude of those two leakage paths, thus modulating the quantity of fluid in and the flow to and from the pressure compartment 37, and thereby maintain a balanced force condition on the spool 17. Fluid can leak, as mentioned, but the pressure remains full, since the leakage alters volume but not pressure of the fluid.

Figure 2:
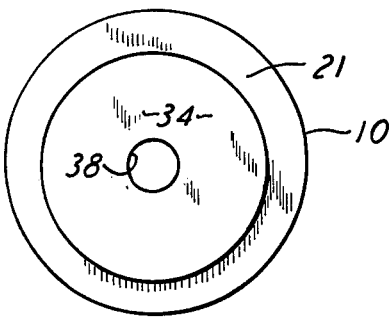
FIG. 2 is an end elevational view of the spool member shown in FIG. 1.

The area of the annulus or surface 19 is the same as the area of the annulus or surface 21, and that is also the same as the area of the surface 34, such as further shown in FIG. 2. Therefore, when fluid enters the inlet 11, it is effective on the area 19 to move the spool to the right, as viewed in FIG. 1, and that pressure is also then available to the passageway 39 and the passageway 38 and will be effective in the compartment 37. Since the surfaces 19 and 34 are of the same area, the pressure in the opening 11 will cause the spool to be in equilibrium with equal pressure directed inwardly on the spool 17 on the respective areas 19 and 34. However, when fluid is applied at the opening 12, it is effective on the annular area 21, and that pressure is therefore available for moving the spool to the left, as viewed in FIG. 1. Accordingly, when the spool moves to the left in FIG. 1, the passageway 39 is almost closed off from the space designated 41, by means of the relationship between the outside diameter of the spool end 17 and the inside diameter designated 47 of the housing piece 24 being almost fluid tight, as explained above. Therefore, the spool outer circumference at the designation 48 will almost fluid-tightly close off with the housing bore designated 47 and thus almost close off the passageway 39 to the space 41, subject to the leakage paths described above. At that time, the compartment 37 is left with only the difference in pressure between the pressure at the openings 11 and 12, and thus the compartment 37 reveals the pressure difference between the fluid lines 13 and 14 or in the openings 11 and 12, and the guage 44 can reveal that pressure difference. If the pressure at the opening 12 is great enough, the spool 17 may further shift to the left to where the passageway 39 is closer to being in full fluid-flow communication with a housing fluid outlet 49, and thus the pressure in the compartment 37 would be reduced to where the spool 17 is again in equilibrium under the fluid pressures being described, but only the leakage path exists.

In the arrangement described, it may be assumed that there is a greater pressure at the inlet opening 11, compared to that at the inlet opening 12, and the inlet pressure at 11 places the spool 17 in equilibrium by virtue of applying that pressure against the surfaces 19 and 34, and then the pressure against the surface 21 in effect is diminishing the effect of the pressure in the inlet 11 to thereby leave a resulting pressure in the compartment 37 and that resulting pressure is the difference between the two inlet pressures. For an accurate pressure differential to be displayed, the areas 19, 21, and 34 are equal. However, there could be proportional areas to show proportional pressure differential, if desired.

What is claimed is:

1. A differential fluid-pressure transducer, comprising a housing having two spaced-apart fluid inlet openings and a fluid outlet opening, a member movably disposed in said housing intermediate said inlet openings and fluid-tightly separating said inlet openings from each other, said member having thereon two areas of one size respectively and independently exposed to said inlet openings, a portion of said member and said housing together defining a compartment and said member being movable relative to said compartment in response to fluid pressure at said two areas, the area of said portion also being of said one size, a fluid passageway extending between said compartment and one of said two areas for fluid flow communication therebetween, said housing having a drain port, said member and said housing having a clearance therebetween and thereby form a variable fluid leakage path in flow communication with said compartment and said one of the said two areas and said drainport, and having said clearance arranged with a variable magnitude to alter fluid volume in accordance with the position of said member relative to said compartment while maintaining full fluid pressure exposed to said one area and when said member is moved in the direction away from said compartment, and said housing fluid outlet being in fluid-flow communication with said compartment for receiving the pressure of the fluid in said compartment in accordance with fluid pressure at said two areas.

2. The differential fluid-pressure transducer as claimed in claim 1, wherein said member is a spool slidably disposed in said housing.

3. The differential fluid-pressure transducer as claimed in claim 2, wherein said spool includes two oppositely-faced annular surfaces which present said two areas, and said portion is one end surface of said spool.

4. The differential fluid-pressure transducer as claimed in claim 3, wherein said housing has a second fluid outlet, and said spool has an additional fluid passageway in fluid-flow communication with said second fluid outlet and with said compartment when said spool moves to a limit position, to thereby alter fluid volume in said compartment.

5. The differential fluid-pressure transducer as claimed in claim 4, including a fluid-pressure responsive instrument in fluid-flow communication with said fluid outlet for the detection of any fluid pressure difference at said two areas.

6. The differential fluid-pressure transducer as claimed in claim 1, including a fluid-pressure responsive instrument in fluid-flow communication with said fluid outlet for the detection of any fluid pressure difference at said two areas.

7. The differential fluid-pressure transducer as claimed in claim 1, wherein said housing has a second fluid outlet, and said member has an additional fluid passageway in fluid-flow communication with said second fluid outlet and with said compartment when said member moves to a limit position, to thereby alter fluid volume in said compartment.

8. The differential fluid-pressure transducer as claimed in claim 7, wherein said member is a spool slidably disposed in said housing and has an end extending across said second fluid outlet, said spool end and said housing being less than fluid tight and arranged to provide a fluid leakage path therebetween, and said additional fluid passageway being in fluid-flow communication with said fluid leakage path for relief of the quantity of fluid in said compartment.

* * * * *